US011442271B2

(12) United States Patent
Choi et al.

(10) Patent No.: US 11,442,271 B2
(45) Date of Patent: Sep. 13, 2022

(54) DISPLAY ILLUMINATION SYSTEMS

(71) Applicant: Apple Inc., Cupertino, CA (US)

(72) Inventors: Hyungryul Choi, San Jose, CA (US);
Eric J Hansotte, Morgan Hill, CA (US); Guolin Peng, Santa Clara, CA (US); Paul J. Gelsinger-Austin, Santa Clara, CA (US); Se Baek Oh, Millbrae, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 16/609,066

(22) PCT Filed: Jun. 5, 2018

(86) PCT No.: PCT/US2018/036143
§ 371 (c)(1),
(2) Date: Oct. 28, 2019

(87) PCT Pub. No.: WO2018/231595
PCT Pub. Date: Dec. 20, 2018

(65) Prior Publication Data
US 2020/0057308 A1    Feb. 20, 2020

Related U.S. Application Data

(60) Provisional application No. 62/519,597, filed on Jun. 14, 2017.

(51) Int. Cl.
*G02B 27/01* (2006.01)
*G02B 5/32* (2006.01)
(Continued)

(52) U.S. Cl.
CPC ............ *G02B 27/0172* (2013.01); *G02B 5/32* (2013.01); *G02B 6/005* (2013.01); *G02B 6/0026* (2013.01);
(Continued)

(58) Field of Classification Search
CPC ...... G02B 27/0172; G02B 5/32; G02B 6/005; G02B 6/0026; G02B 2027/0174; G03H 1/0248; G03H 2222/31
(Continued)

(56) References Cited

U.S. PATENT DOCUMENTS 5,455,693 A * 10/1995 Wreede ................. G03H 1/22
                                                     359/34
5,818,554 A    10/1998 Hiyama et al.
(Continued)

FOREIGN PATENT DOCUMENTS

CN    1774661 A    5/2006
CN    1781052 A    5/2006
(Continued)

*Primary Examiner* — Collin X Beatty
(74) *Attorney, Agent, or Firm* — Treyz Law Group, P.C.; G. Victor Treyz; Tianyi He (57) ABSTRACT

An electronic device may have a reflective display with a pixel array that generates images. The reflective display may be illuminated by an illumination system. Light from the illumination system may be reflected by the pixel array as image light. The image light may be provided to a viewer using a waveguide with diffractive input and output couplers. The illumination system may have a waveguide. The illumination system may also have a light source such as one or more light-emitting diodes. Light from the light source may be coupled into the waveguide of the illumination system by a diffractive coupler such as volume hologram that serves as an input coupler. Light from the light source may be routed to the display to illuminate the display using the waveguide in the illumination system and a diffractive coupler such as a volume hologram that serves as an output coupler.

19 Claims, 8 Drawing Sheets

(51) Int. Cl.
*F21V 8/00* (2006.01)
*G03H 1/02* (2006.01)

(52) U.S. Cl.
CPC ... *G03H 1/0248* (2013.01); *G02B 2027/0174* (2013.01); *G03H 2222/31* (2013.01)

(58) Field of Classification Search
USPC .......................................................... 359/13
See application file for complete search history.

(56) References Cited

U.S. PATENT DOCUMENTS

| | | |
|---|---|---|
| 7,570,846 B2 | 8/2009 | Meir et al. |
| 8,434,909 B2 | 5/2013 | Nichol et al. |
| 8,917,962 B1 | 12/2014 | Nichol et al. |
| 9,164,290 B2 | 10/2015 | Robbins et al. |
| 10,393,941 B2 * | 8/2019 | Nichol ................. G02B 6/0028 |
| 2006/0228037 A1 | 10/2006 | Mukawa et al. |
| 2012/0287674 A1 | 11/2012 | Nichol et al. |
| 2014/0140653 A1 | 5/2014 | Brown et al. |
| 2015/0277116 A1 | 10/2015 | Richards et al. |
| 2016/0238772 A1 | 8/2016 | Waldern et al. |
| 2016/0291328 A1 | 10/2016 | Popovich et al. |

FOREIGN PATENT DOCUMENTS

| | | |
|---|---|---|
| CN | 101446684 A | 6/2009 |
| CN | 103562802 A | 2/2014 |
| CN | 103823267 A | 5/2014 |
| CN | 104423042 A | 3/2015 |
| CN | 106133569 A | 11/2016 |
| EP | 3062142 A1 | 8/2016 |
| WO | 2014140620 A2 | 9/2014 |

\* cited by examiner

DISPLAY ILLUMINATION SYSTEMS

This application claims priority to provisional patent application No. 62/519,597, filed on Jun. 14, 2017, which is hereby incorporated by reference herein in its entirety.

BACKGROUND

This relates generally to electronic devices and, more particularly, to electronic devices with displays.

Electronic devices with displays may be used to display content for a user. If care is not taken, the components used in displaying content for a user in an electronic device may be unsightly and bulky and may not exhibit desired levels of optical performance.

SUMMARY

An electronic device may have a reflective display with a pixel array that generates images. The reflective display may be illuminated by an illumination system. During operation, light from the illumination system may be reflected by the pixel array as image light. The image light may be provided to a viewer using an optical system having a waveguide and holographic input and output couplers.

The illumination system may have a waveguide. The illumination system may also have a light source such as one or more light-emitting diodes or lasers. Light from the light source may be coupled into the waveguide of the illumination system by a diffractive coupler such as a volume hologram that serves as an input coupler. Light from the light source may be routed to the display using the waveguide in the illumination system and a diffractive coupler such as a volume hologram that serves as an output coupler. Light that has been coupled out of the waveguide in the illumination system by the output coupler reflects from the pixel array as image light and may be provided to the viewer with the optical system.

DETAILED DESCRIPTION

Head-mounted devices and other devices may be used for virtual reality and augmented reality systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include displays and other optical components. Device configurations in which virtual reality and/or augmented reality content is provided to a user with a head-mounted display device are described herein as an example. This is, however, merely illustrative. Any suitable equipment may be used in providing a user with virtual reality and/or augmented reality content.

A head-mounted device such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays in a display system to the eyes of a viewer. A waveguide such as a thin planar waveguide formed from a sheet of transparent material such as glass or plastic or other light guide may be included in the optical system to convey image light from the pixel arrays to the viewer. This type of waveguide may also be used to carry light in an illumination system that is configured to provide illumination to a display system. The display system may include reflective displays such as liquid-crystal-on-silicon displays, microelectromechanical systems (MEMs) displays, or other displays.

The illumination system may include a light source that supplies illumination for the display. The illuminated display produces image light. An input optical coupler may be used to couple light from the light source into a waveguide in the illumination system. An output optical coupler may be used to couple display illumination out of the waveguide. Input and output couplers may also be used to couple image light from the display into a waveguide in the optical system and to couple the image light out of the waveguide for viewing by the viewer.

The input and output couplers for head-mounted device may form structures such as Bragg gratings that couple light into the waveguides and that couple light out of the waveguides. Input and output optical couplers may be formed from diffractive couplers such as volume holograms, other holographic coupling elements, or other diffractive coupling structures. The input and output couplers may, for example, be formed from thin layers of polymers and/or other optical coupler structures in which holographic patterns are recorded using lasers. In some configurations, optical couplers may be formed from dynamically adjustable devices such as adjustable gratings formed from microelectromechanical systems (MEMs) components, liquid crystal components (e.g., tunable liquid crystal gratings, polymer dispersed liquid crystal devices), or other adjustable optical couplers.

Figure 1:
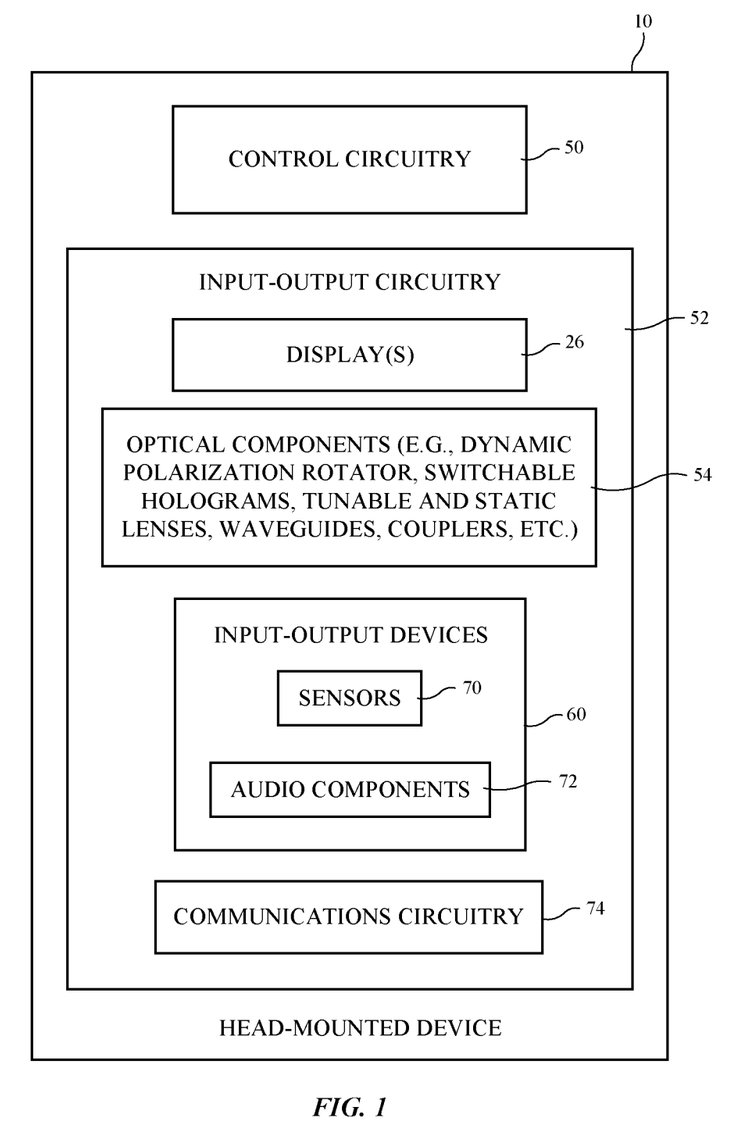
FIG. 1 is a schematic diagram of an illustrative head-mounted device in accordance with an embodiment.

A schematic diagram of an illustrative head-mounted device is shown in FIG. 1. As shown in FIG. 1, head-mounted device 10 may have control circuitry 50. Control circuitry 50 may include storage and processing circuitry for controlling the operation of head-mounted display 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement operations for head-mounted display 10 (e.g., data gathering operations, operations involving the adjustment of components using control signals, image rendering operations to produce image content to be displayed for a user, etc.).

Head-mounted device 10 may include input-output circuitry 52. Input-output circuitry 52 may be used to allow data to be received by head-mounted display 10 from external equipment (e.g., a tethered computer, a portable device such as a handheld device or laptop computer, or other electrical equipment) and to allow a user to provide head-mounted device 10 with user input. Input-output circuitry 52 may also be used to gather information on the environment in which head-mounted device 10 is operating. Output components in circuitry 52 may allow head-mounted device 10 to provide a user with output and may be used to communicate with external electrical equipment.

As shown in FIG. 1, input-output circuitry 52 may include one or more displays such as display(s) 26. Display(s) 26 may be used to display images for a user of head-mounted device 10. Display(s) 26 have pixel array(s) to generate images that are presented to a user through an optical system. The optical system may, if desired, have a transparent portion through which the user (viewer) can observe real-world objects while computer-generated content is overlaid on top of the real-world objects by producing computer-generated images on the display(s) 26.

Optical components 54 may be used in forming the optical system that presents images to the user. Components 54 may include static components such as waveguides, static optical couplers, and fixed lenses. Components 54 may also include adjustable optical components such as an adjustable polarizer, tunable lenses (e.g., liquid crystal tunable lenses, tunable lenses based on electrooptic materials, tunable liquid lenses, microelectromechanical systems (MEMS) tunable lenses, or other tunable lenses), a dynamically adjustable coupler (e.g., an adjustable MEMs grating or other coupler, an adjustable liquid crystal holographic coupler such as an adjustable liquid crystal Bragg grating coupler, adjustable holographic couplers (e.g., electro-optical devices such as tunable Bragg grating couplers, polymer dispersed liquid crystal devices), couplers, lenses, and other optical devices formed from electro-optical materials (e.g., lithium niobate or other materials exhibiting the electro-optic effect), or other static and/or tunable optical components. Components 54 may be used in proving light to display 26 to illuminate display 26 and in may be used in providing images from display 26 to a user for viewing. In some configurations, one or more of components 54 may be stacked, so that light passes through multiple components in series. In other configurations, components may be spread out laterally (e.g., multiple displays may be arranged on a waveguide or set of waveguides using a tiled set of laterally adjacent couplers). Configurations may also be used in which both tiling and stacking are present.

Input-output circuitry 52 may include components such as input-output devices 60 for gathering data and user input and for supplying a user with output. Devices 60 may include sensors 70, audio components 72, and other components for gathering input from a user or the environment surrounding device 10 and for providing output to a user. Devices 60 may, for example, include keyboards, buttons, joysticks, touch sensors for trackpads and other touch sensitive input devices, cameras, light-emitting diodes, and/or other input-output components.

Cameras or other devices in input-output circuitry 52 may face a user's eyes and may track a user's gaze. Sensors 70 may include position and motion sensors (e.g., compasses, gyroscopes, accelerometers, and/or other devices for monitoring the location, orientation, and movement of head-mounted display 10, satellite navigation system circuitry such as Global Positioning System circuitry for monitoring user location, etc.). Using sensors 70, for example, control circuitry 50 can monitor the current direction in which a user's head is oriented relative to the surrounding environment. Movements of the user's head (e.g., motion to the left and/or right to track on-screen objects and/or to view additional real-world objects) may also be monitored using sensors 70.

If desired, sensors 70 may include ambient light sensors that measure ambient light intensity and/or ambient light color, force sensors, temperature sensors, touch sensors, capacitive proximity sensors, light-based proximity sensors, other proximity sensors, strain gauges, gas sensors, pressure sensors, moisture sensors, magnetic sensors, etc. Audio components 72 may include microphones for gathering voice commands and other audio input and speakers for providing audio output (e.g., ear buds, bone conduction speakers, or other speakers for providing sound to the left and right ears of a user). If desired, input-output devices 60 may include haptic output devices (e.g., vibrating components), light-emitting diodes and other light sources, and other output components. Circuitry 52 may include wired and wireless communications circuitry 74 that allows head-mounted display 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
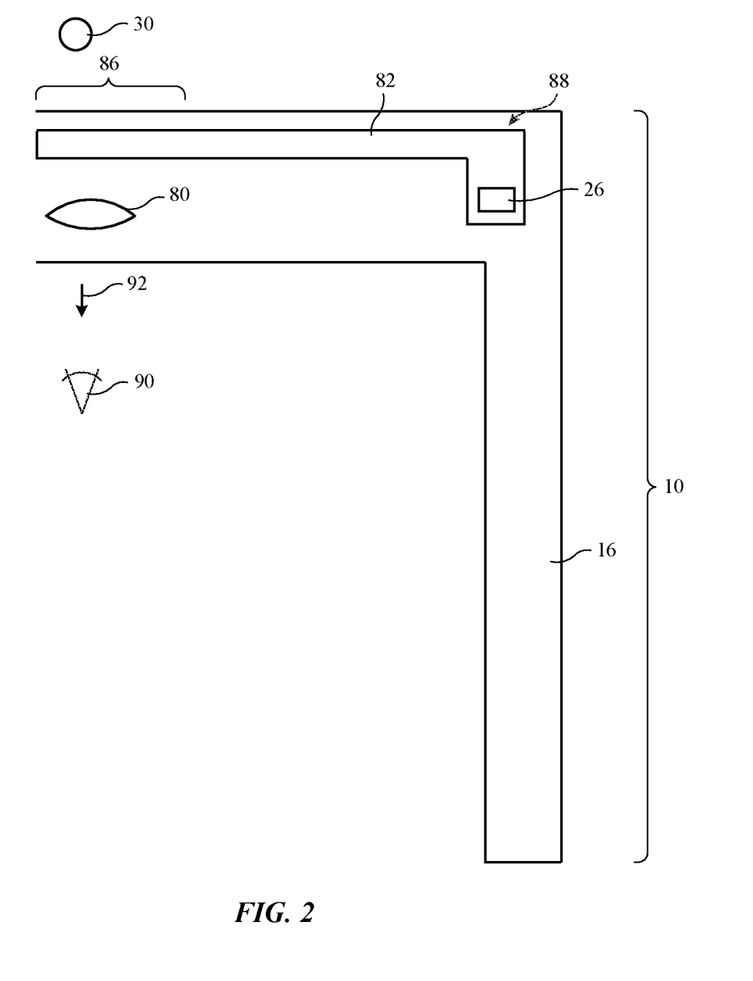
FIG. 2 is a diagram of an illustrative head-mounted device in accordance with an embodiment.

The components of head-mounted display 10 may be supported by a head-mountable support structure such as illustrative support structure 16 of FIG. 2. Support structure 16, which may sometimes be referred to as a housing, may be configured to form a frame of a pair of glasses (e.g., left and right temples and other frame members), may be configured to form a helmet, may be configured to form a pair of goggles, or may have other head-mountable configurations.

Optical system 84 may be supported within support structure 16 and may be used to provide images from displays 26 to a user (see, e.g., the eyes of user 90 of FIG. 2). With one illustrative configuration, displays 26 may be located in outer (edge) portions 88 of optical system 84 and may have one or more pixel arrays that produce images. Light associated with the images may be coupled into waveguides in outer portions 88 using input coupler systems. The waveguides may traverse intermediate regions 82. In central portion(s) 86 of system 84 (at the opposing ends of the waveguides from the input coupler systems and displays 26), output coupler systems formed from one or more output couplers may couple the light out of the waveguides. This light may pass through optional lenses 80 in direction 92 for viewing by user 90. Portion(s) 86 of optical system 84 may be transparent, so that user 90 may view external objects such as object 30 through this region of system 84 while system 84 overlays computer-generated content (image content generated by control circuitry 50) with objects such as object 30.

Figure 3:
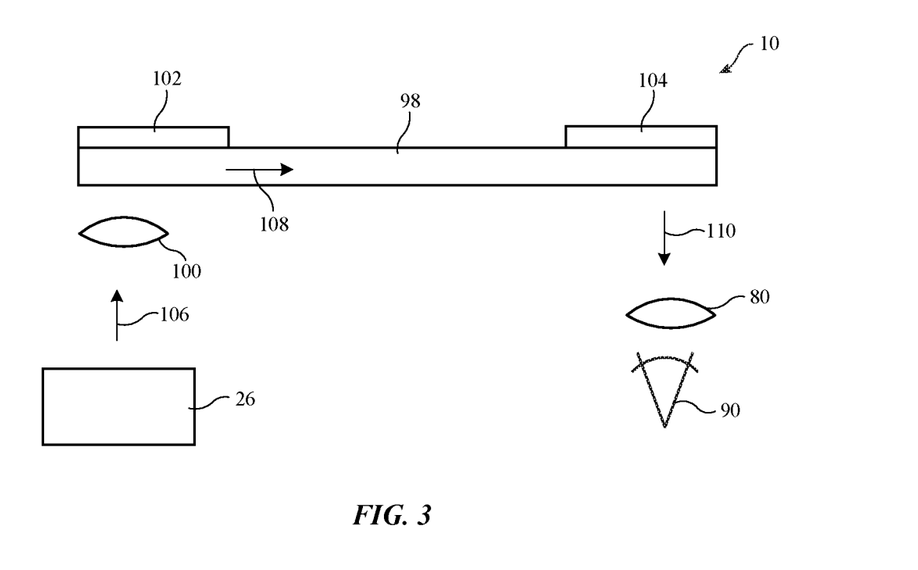
FIG. 3 is a side view of an illustrative optical system and associated display system for a head-mounted device in accordance with an embodiment.

FIG. 3 is a diagram of illustrative components that may be used in forming device 10. The diagram of FIG. 3 includes components for one of the user's eyes. Device 10 may contain two sets of such components to present images to both of a user's eyes.

As shown in FIG. 3, device 10 may include a display such as display 26 for producing image light 106. Image light 106 may be generated by illuminating a reflective display containing an array of pixels. The images presented on the array of pixels may be conveyed through lens 100 to input coupler 102, which couples image light 106 into waveguide 98 (e.g., a planar waveguide). The image light coupled into waveguide 98 is confined within waveguide 98 in accordance with the principal of total internal reflection and travels towards output coupler 104 as indicated by light 108. Output coupler 104 couples light 108 (image light) out of waveguide 98 and towards viewer 90 (an eye of a user), as output light (output image light) 110. Lens 80 may help focus image light for viewer 90. Input coupler 102 and output coupler 104 may be, for example, structures such as Bragg gratings that couple light into waveguides and that couple light out of the waveguides. Couplers 102 and 104 may be formed from volume holograms or other holographic coupling elements (e.g., thin layers of polymers and/or other optical coupler structures in which holographic patterns are recorded using lasers). Couplers 102 and 104 may have infinite focal lengths (e.g., couplers 102 and 104 may be plane-to-plane couplers) or may have associated finite focal lengths. For example, optical coupler 104 can be powered (e.g., coupler 104 can be configured to form a lens of a desired finite focal length) in which case lens 80 may be omitted or the focal length of lens 80 may be adjusted.

Figure 4:
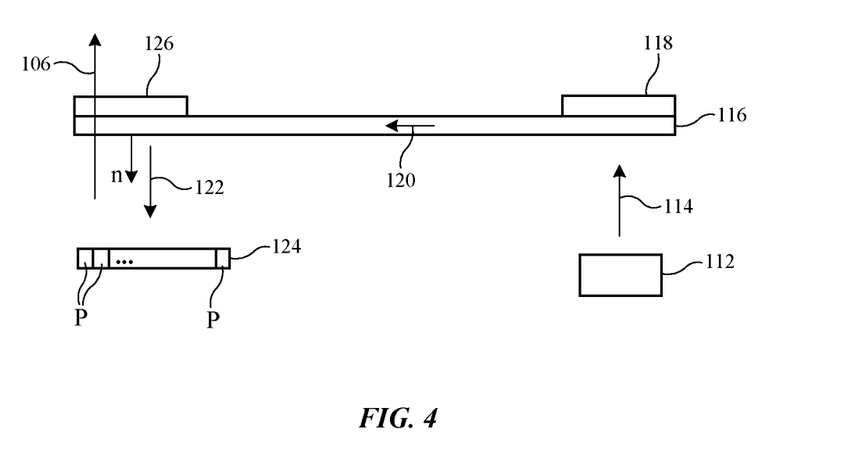
FIG. 4 is a side view of an illustrative display illumination system in accordance with an embodiment.

Display 26 may have a reflective pixel array (reflective display) such as pixel array 124 of FIG. 4. Pixel array 124 may be, for example, a liquid-crystal-on-silicon display, a microelectromechanical systems (MEMs) display, or other display (e.g., a reflective display) that is illuminated by a light source to create image light 106. During operation, pixels P in pixel array (display) 124 may be adjusted based on image data received from control circuitry 50 to generate images.

The size of the illumination system for pixel array 124 can be reduced using waveguide structures and compact optical couplers. In the example of FIG. 4, illumination for pixel array 124 is produced by light source 112. Light source 112 may be formed from one or more light-emitting diodes (e.g., red, green, and blue light-emitting diodes, white light-emitting diodes and/or light-emitting diodes of other colors), lasers of one or more colors, or other suitable light sources. Operation of device 10 using a single wavelength of light may sometimes be described herein as an example. In general, display 124 of device 10 may be illuminated using light-emitting diodes of multiple colors and the optical components of device 10 (e.g., holographic couplers, etc.) may be stacked or otherwise multiplexed (e.g., by writing holograms with multiple different laser beams each of a different wavelength, etc.) to accommodate operation at multiple wavelengths.

During operation, light source 112 may produce light 114. Light 114 may be coupled into waveguide 116 by input coupler 118. Waveguide 116 (and waveguide 98 of FIG. 3) may be formed from a thin transparent film of polymer, glass, or other suitable clear material. Light 114 that has been coupled into waveguide 116 by input coupler 118 may be confined to waveguide 116 in accordance with the principal of total internal reflection. After this light (light 120 of FIG. 4) travels through waveguide 116 to output coupler 126, output coupler 126 can couple light 120 out of waveguide 116 towards display pixel array 124 as display illumination 122 (e.g., in a direction that is parallel to surface normal n of waveguide 116). After illuminating pixels P, this light is reflected towards input coupler 102 on waveguide 98 (FIG. 3) as image light 106.

Input coupler 118 and output coupler 126 may be, for example, structures such as Bragg gratings and may be formed from volume holograms or other holographic coupling elements (e.g., thin layers of polymers and/or other optical coupler structures in which holographic patterns are recorded using lasers). Couplers 118 and 126 may have infinite focal lengths (e.g., couplers 118 and 126 may be plane-to-plane couplers) or may have associated finite focal lengths. If desired, one or more of couplers 102, 104, 118, and 126 may be formed from prisms, lenses, or other non-holographic optical elements. The use of holographic coupler structures in forming some or all of couplers 102, 104, 118, and 126 may help reduce size and weight for device 10 and may facilitate the incorporation of optical components 54 within housing 16.

Figure 5:
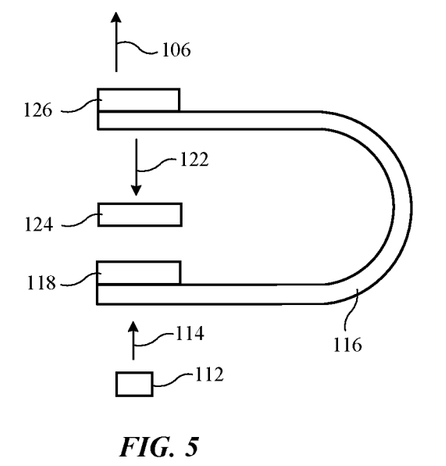
FIG. 5 is a cross-sectional side view of an illustrative display illumination system with a bent waveguide in accordance with an embodiment.

As shown in FIG. 5, illumination system waveguide 116 (and, if desired, waveguide 98 of FIG. 3) may be bent to accommodate curves and other features in housing 16 of device 10. The amount of bending may be limited to preserve the ability of the waveguides to confine light.

Figure 6:
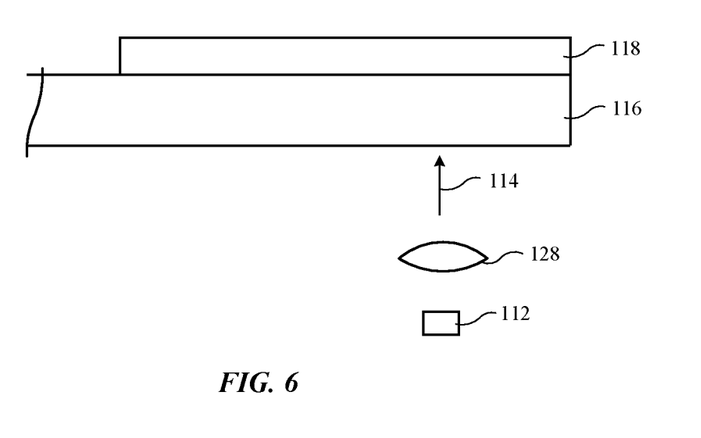
FIG. 6 is a side view of a portion of an illustrative display illumination system having a lens to help couple light from a light source into a waveguide in the system in accordance with an embodiment.

FIG. 6 is a side view of a portion of an illumination system showing how a lens (with one or more lens elements) such as lens 128 may optionally be interposed between light source 112 waveguide 116 (and therefore interposed between light source 112 and input coupler 118). Lens and waveguide 116 and input coupler 118.

Due to reciprocity (symmetry in the diffraction of light passing through holograms), it can be challenging to ensure that light 106 passes through output coupler 126 without being coupled back into waveguide 116 in the direction from which light 120 originated. Various techniques may be used to avoid undesired backwards light coupling in the display illumination system of device 10.

Figure 7:
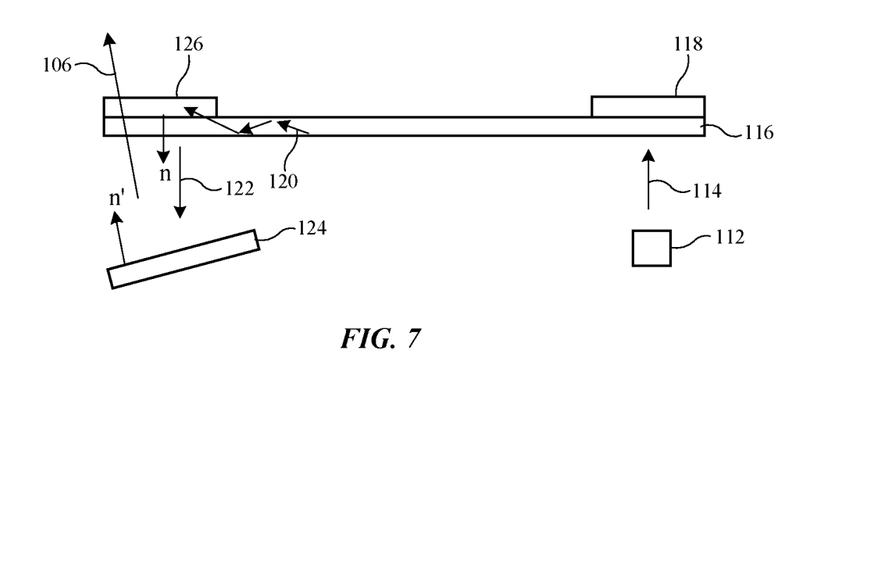
FIG. 7 is a side view of a portion of an illustrative display illumination system showing how a display may be tilted relative to a waveguide and coupler in the system in accordance with an embodiment.
Figure 8:
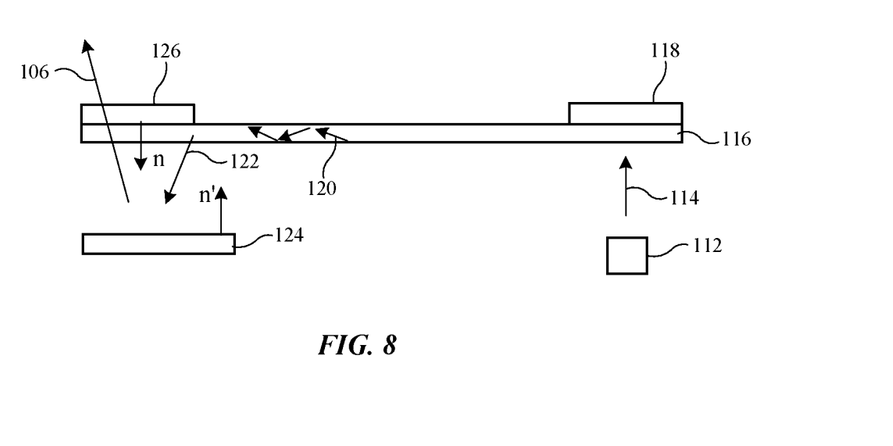
FIG. 8 is a side view of a portion of an illustrative display illumination system with an output coupler formed from a volume hologram written at an offset angle in accordance with an embodiment.

With the illustrative configuration of FIG. 7, pixel array 124 (e.g., surface normal n' of pixel array 124) is tilted at a non-zero angle with respect to surface normal n of output coupler 126. Light 120 strikes output coupler 126 with a range of angles about an angle θB with respect to surface normal n (e.g., a Bragg angle associated with a grating in output coupler 126) that is associated with efficiently coupling of light towards display 124 as illumination 122. Because pixel array 124 is tilted (e.g., because the surface normal n' of the plane in which pixel array 124 lies is not parallel to surface normal n), image light 106 (e.g., light 122 that has reflected off of pixel array 124) will make an angle with surface normal n that is different than angle θB (e.g., an angle at which coupler 126 is not as efficient as redirecting light as when the light matches angle θB). As a result, image light 106 can pass through output coupler 126 with low diffraction (e.g., minimal coupling back into waveguide 116), If desired, undesired coupling of image light 106 into waveguide 116 can be reduced by forming the grating of coupler 126 (e.g., writing the volume hologram for coupler 126) with a laser that is oriented at an appropriate offset angle. As shown in FIG. 8, this produces a hologram that directs light 122 out of waveguide 116 at a non-zero angle to surface normal n and may be used to reduce undesired coupling of image light 106 into waveguide 116 instead of or in addition to tilting pixel array 124. When coupler 126 is formed from a volume hologram written with appropriately angled laser light, light 120 is coupled out of waveguide 116 at a non-zero angle with respect to surface normal n and will reflect off of pixel array 124 as image light 106 at a corresponding non-zero angle, as shown in FIG. 8. As light 106 travels through coupler 126, the angle that light 106 makes with respect to the grating in coupler 126 will be different than the expected angle θB for efficient coupling, so light 106 will not be coupled into waveguide 116.

Figure 9:
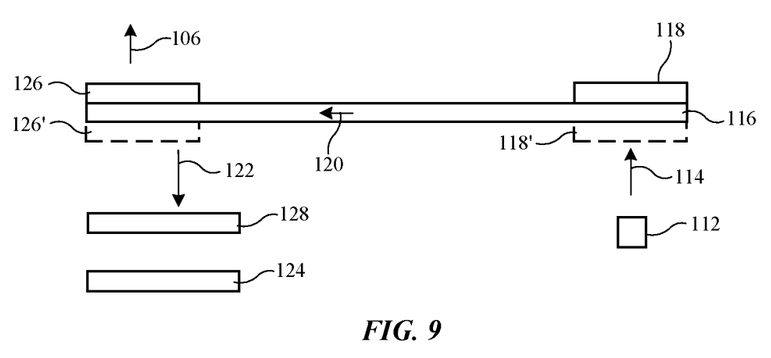
FIG. 9 is a side view of an illustrative display illumination system with a wave plate and polarization-sensitive holographic couplers in accordance with an embodiment.

As shown in the illustrative configuration of FIG. 9, polarization selectively may be used to help reduce back-coupling of light 106 into waveguide 116. Light 114 is coupled into waveguide 116 as light 120 using input coupler 118. Input coupler 118 may be a reflection hologram or, if desired, may be a polarization sensitive hologram such as a polarization-sensitive transmission hologram (see, e.g., transmission hologram input coupler 118'). After traveling through waveguide 116, light 120 reaches output coupler 126. Output coupler 126 may be a reflection hologram or, if desired, may be a polarization sensitive hologram such as a polarization-sensitive transmission hologram (see, e.g., transmission hologram output coupler 126').

A wave plate such as wave plate 128 (e.g., a quarter wave plate) may be interposed between output coupler 126 and pixel array 124. Light 122 may be polarized. Polarized light 122 passes through wave plate 128 and is reflected off of pixel array 124. After passing through wave plate 128 again in the reverse direction, reflected image light 106 passes through waveguide 116 and output coupler 126 without being coupled back into waveguide 116.

The use of polarized light and polarization-sensitive optical components in the system of FIG. 8 helps minimize coupling of image light 106 into waveguide 116. With one illustrative configuration, the input coupler may be polarization sensitive and may, as an example, couple only light 114 that is p polarized into waveguide 116. Light source 112 may produce light 114 that is unpolarized or that is predominantly p-polarized (in this example).

The p polarization of the portion of light 114 that has been coupled into in waveguide 116 (the p polarization of light 120) may be maintained as light 120 travels along the length of waveguide 116. The output coupler may be configured to exhibit a first efficient diffraction angle (Bragg-matching condition angle θBp) for p-polarized light and to exhibit a different second efficient diffraction angle (Bragg-matching condition angle θBs) for s-polarized light. P-polarized light 120 may be characterized by an angle of incidence on the output coupler of angle θBp (a range of light ray angles centered on angle θBp) and may therefore be efficiently directed out of waveguide 116 as light 122 by the output coupler (which is configured to couple out light that reaches the output coupler with angle θBp. After passing through waveplate 128, reflecting off of pixel array 124, and passing again through waveplate 128, the polarization of light 122 will rotate by 90° (in this example). As a result, light 106 will be s polarized and will not be diffracted efficiently by the output coupler. Light 106 will therefore pass through the output coupler as shown in FIG. 9. If desired, the input and output couplers may have other types of polarization sensitivities. For example, the input and output couplers may be configured to couple right-hand circularly polarized light (or left-hand circularly polarized light) into and out of waveguide 116.

In accordance with an embodiment, a device with an illumination system is provided that includes a pixel array, a light source, a waveguide, a diffractive input coupler that couples light from the light source into the waveguide, and a diffractive output coupler that couples light from the waveguide out of the waveguide and onto the pixel array to illuminate the pixel array and reflect image light from the pixel array.

In accordance with another embodiment, the device includes an optical system having an input portion and an output portion, the optical system is configured to receive the image light from the pixel array with the input portion.

In accordance with another embodiment, the optical system includes an optical system waveguide that forms at least part of the input portion and at least part of the output portion and that receives the image light using the input portion.

In accordance with another embodiment, the output portion includes a diffractive optical system output coupler that is configured to couple the image light out of the optical system waveguide.

In accordance with another embodiment, the pixel array is tilted with respect to the diffractive output coupler.

In accordance with another embodiment, the diffractive output coupler is recorded at an offset angle and is configured to direct light out of the waveguide at a non-zero angle with respect to a surface normal of the waveguide.

In accordance with another embodiment, the diffractive output coupler includes a polarization-sensitive volume hologram.

In accordance with another embodiment, the diffractive input coupler includes a polarization-sensitive volume hologram.

In accordance with another embodiment, the diffractive output coupler is a transmission hologram and the diffractive input coupler is a transmission hologram.

In accordance with another embodiment, the pixel array is tilted with respect to the diffractive output coupler.

In accordance with another embodiment, the diffractive output coupler is configured to direct light out of the waveguide at a non-zero angle with respect to a surface normal of the waveguide.

In accordance with another embodiment, the device includes a waveplate between the diffractive output coupler and the pixel array, the diffractive output coupler includes a polarization-sensitive transmission hologram.

In accordance with another embodiment, the pixel array includes a liquid-crystal-on-silicon display.

In accordance with another embodiment, the pixel array includes a microelectromechanical systems display.

In accordance with another embodiment, the light source includes a light source selected from the group consisting of a light-emitting diode and a laser.

In accordance with another embodiment, the device includes a lens interposed between the light source and the waveguide, and a wearable housing that supports the pixel array, the light source, and the waveguide.

In accordance with an embodiment, a device with an illumination system is provided that includes a pixel array, a light source, a waveguide, a first diffractive coupler configured to couple light from the light source into the waveguide, and a second diffractive coupler configured to couple light out of the waveguide, a pixel array configured to reflect the light coupled out of the waveguide as image light that passes through the second diffractive coupler and the waveguide.

In accordance with another embodiment, the device includes an optical system with an additional waveguide that carries the image light.

In accordance with another embodiment, the optical system includes a third diffractive coupler configured to couple the image light out of the additional waveguide.

In accordance with an embodiment, a device with an illumination system is provided that includes first and second display, at least first and second light-emitting diodes that produce first and second light, first and second waveguide, a first diffractive coupler that couples the light from the first light-emitting diode into the first waveguide, a second diffractive coupler that couples the light from the first light-emitting diode out of the first waveguide, the first display reflects the light coupled out of the first waveguide as first image light that passes through the second diffractive coupler and at least part of the first waveguide, a third diffractive coupler that couples the light from the second light-emitting diode into the second waveguide, and a fourth diffractive coupler that couples the light from the second light-emitting diode out of the second waveguide, the second display reflects the light coupled out of the second waveguide as second image light that passes through the fourth diffractive coupler and at least part of the second waveguide.

The foregoing is merely illustrative and various modifications can be made to the described embodiments. The foregoing embodiments may be implemented individually or in any combination.

What is claimed is:

1. A device with an illumination system, comprising:
a pixel array;
a light source;
a waveguide;
a diffractive input coupler that couples light from the light source into the waveguide; and
a diffractive output coupler that couples light from the waveguide out of the waveguide and onto the pixel array to illuminate the pixel array and reflect image light from the pixel array, wherein the pixel array is tilted with respect to the diffractive output coupler.

2. The device defined in claim 1 further comprising:
an optical system having an input portion and an output portion, wherein the optical system is configured to receive the image light from the pixel array with the input portion.

3. The device defined in claim 2 wherein the optical system includes an optical system waveguide that forms at least part of the input portion and at least part of the output portion and that receives the image light using the input portion.

4. The device defined in claim 3 wherein the output portion includes a diffractive optical system output coupler that is configured to couple the image light out of the optical system waveguide.

5. The device defined in claim 4 wherein the diffractive output coupler is recorded at an offset angle and is configured to direct light out of the waveguide at a non-zero angle with respect to a surface normal of the waveguide.

6. The device defined in claim 4 wherein the diffractive output coupler comprises a polarization- sensitive volume hologram.

7. The device defined in claim 6 wherein the diffractive input coupler comprises a polarization-sensitive volume hologram.

8. The device defined in claim 7 wherein the diffractive output coupler is a transmission hologram and wherein the diffractive input coupler is a transmission hologram.

9. The device defined in claim 1 wherein the diffractive output coupler is configured to direct light out of the waveguide at a non-zero angle with respect to a surface normal of the waveguide.

10. The device defined in claim 1 further comprising a waveplate between the diffractive output coupler and the pixel array, wherein the diffractive output coupler comprises a polarization-sensitive transmission hologram.

11. The device defined in claim 1 wherein the pixel array comprises a liquid-crystal-on-silicon display.

12. The device defined in claim 1 wherein the pixel array comprises a microelectromechanical systems display.

13. The device defined in claim 1 wherein the light source comprises a light source selected from the group consisting of: a light-emitting diode and a laser.

14. The device defined in claim 13 further comprising:
a lens interposed between the light source and the waveguide; and
a wearable housing that supports the pixel array, the light source, and the waveguide.

15. A device with an illumination system, comprising:
a light source;
a waveguide;
a first diffractive coupler configured to couple light from the light source into the waveguide;
a second diffractive coupler configured to couple light out of the waveguide; and
a pixel array configured to reflect the light coupled out of the waveguide as image light that passes through the second diffractive coupler and through the waveguide at a non-zero angle with respect to a surface normal of the waveguide.

16. The device defined in claim 15 further comprising:
an optical system with an additional waveguide that carries the image light.

17. The device defined in claim 16 wherein the optical system further comprises:
a third diffractive coupler configured to couple the image light out of the additional waveguide.

18. A device with an illumination system, comprising:
first and second displays;
at least first and second light-emitting diodes;
first and second waveguides;
a first diffractive coupler that couples light from the first light-emitting diode into the first waveguide;
a second diffractive coupler that couples the light from the first light-emitting diode out of the first waveguide, wherein the first display reflects the light coupled out of the first waveguide as first image light that passes through the second diffractive coupler at a non-zero angle with respect to a surface normal of the second diffractive coupler and through at least part of the first waveguide;
a third diffractive coupler that couples light from the second light-emitting diode into the second waveguide; and
a fourth diffractive coupler that couples the light from the second light-emitting diode out of the second waveguide, wherein the second display reflects the light coupled out of the second waveguide as second image light that passes through the fourth diffractive coupler and at least part of the second waveguide.

19. A device with an illumination system, comprising:
a pixel array;
a light source;
a waveguide;
a diffractive input coupler that couples light from the light source into the waveguide; and
a diffractive output coupler that couples light from the waveguide out of the waveguide and onto the pixel array to illuminate the pixel array and reflect image light from the pixel array, wherein the diffractive output coupler is configured to direct light out of the waveguide at a non-zero angle with respect to a surface normal of the waveguide.

* * * * *